J. A. OSTENBERG.
MOTOR PLOW.
APPLICATION FILED DEC. 2, 1913.

1,117,432.

Patented Nov. 17, 1914.
4 SHEETS—SHEET 1.

WITNESSES:
John A. Naismith
J. B. Cambers

INVENTOR
John Albert Ostenberg
BY R. C. Bates
HIS ATTORNEY

J. A. OSTENBERG.
MOTOR PLOW.
APPLICATION FILED DEC. 2, 1913.

1,117,432.

Patented Nov. 17, 1914.

4 SHEETS—SHEET 2.

WITNESSES:
John A. Naismith
J. B. Cambers

INVENTOR
John Albert Ostenberg
BY F. C. Bates
HIS ATTORNEY

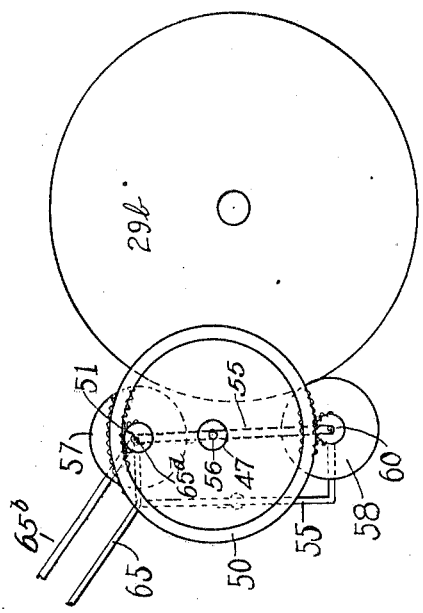
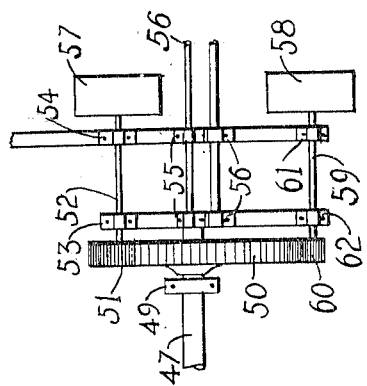
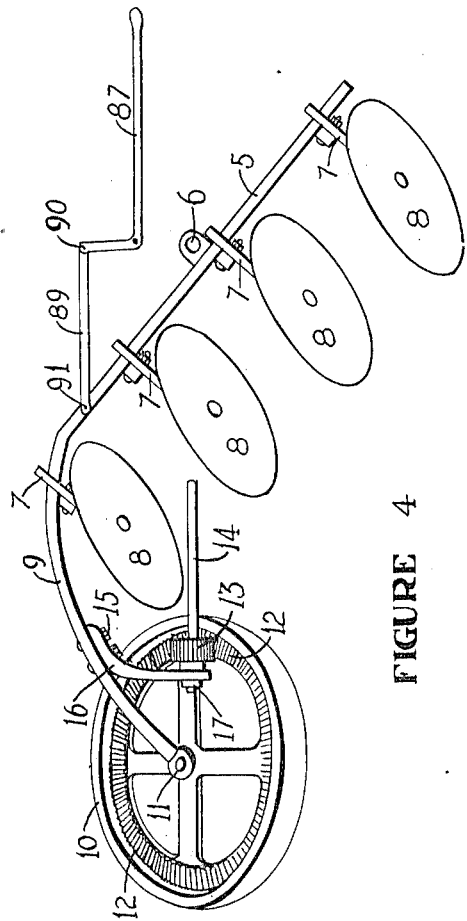

UNITED STATES PATENT OFFICE.

JOHN ALBERT OSTENBERG, OF CAMPBELL, CALIFORNIA.

MOTOR-PLOW.

1,117,432.   Specification of Letters Patent.   Patented Nov. 17, 1914.

Application filed December 2, 1913. Serial No. 804,188.

*To all whom it may concern:*

Be it known that I, JOHN ALBERT OSTENBERG, a citizen of the United States, residing at R. R. No. 9, Campbell, in the county of Santa Clara and State of California, have invented certain new and useful Improvements in Motor-Plows, of which the following is a specification.

My invention relates to new and useful improvements in motor plows and more particularly to a combined motor and plow having a long wheel base for working, and a short wheel base for turning and maneuvering the machine into position for starting a new furrow, which is very necessary in orchard plowing.

An object of my invention is to provide a motor plow for the above purpose, and one in which the entire motor and plows will be under the control of one operator seated on said machine, and one in which the plows may be adjusted by the operator to such an angle that they will take a desired position in line with either traction wheel, thus permitting furrows to be cut close to the trees in an orchard in either direction, at the same time cutting straight furrows and pulling from the center of the plow frame, this center pull giving an even draft to both traction wheels.

A further object is to provide means whereby motor plows may be of as light weight as possible, to avoid packing the soil.

A further object is to provide means by which the motor power may be transmitted to the wheels that carry the plows.

A further object is to provide means by which the plows may be worked on either side of a central power transmission.

A further object is to provide means by which the furrow wheel may be driven by said transmitted power.

A further object is to provide means by which the plows may be raised up clear from the ground when found necessary.

Finally, an important object of my invention is to provide a motor plow of the character described which will be strong, durable, simple and efficient, and comparatively inexpensive to construct, and also one which will not be likely to get out of working order.

Figure 1:
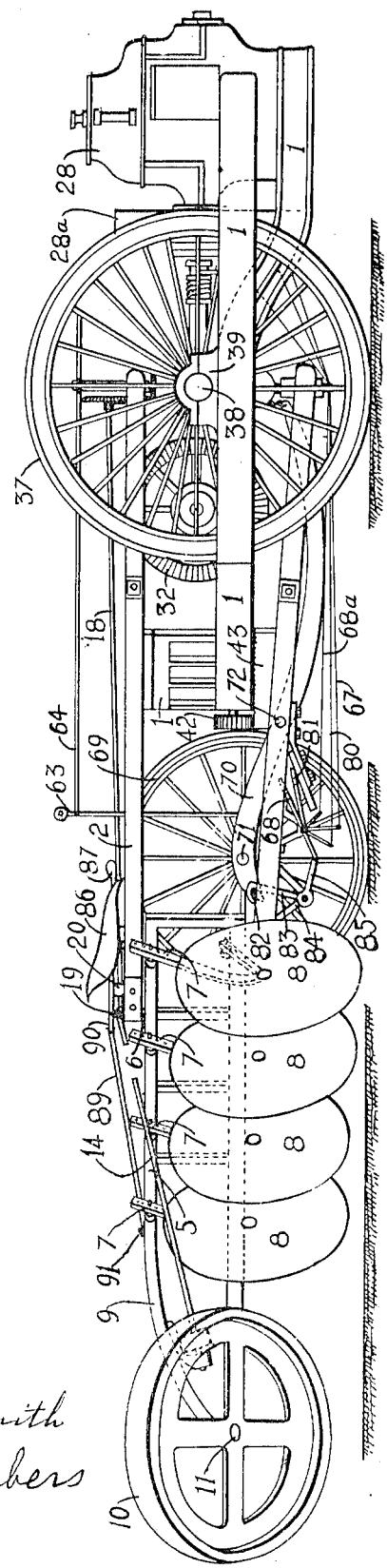
Figure 2:
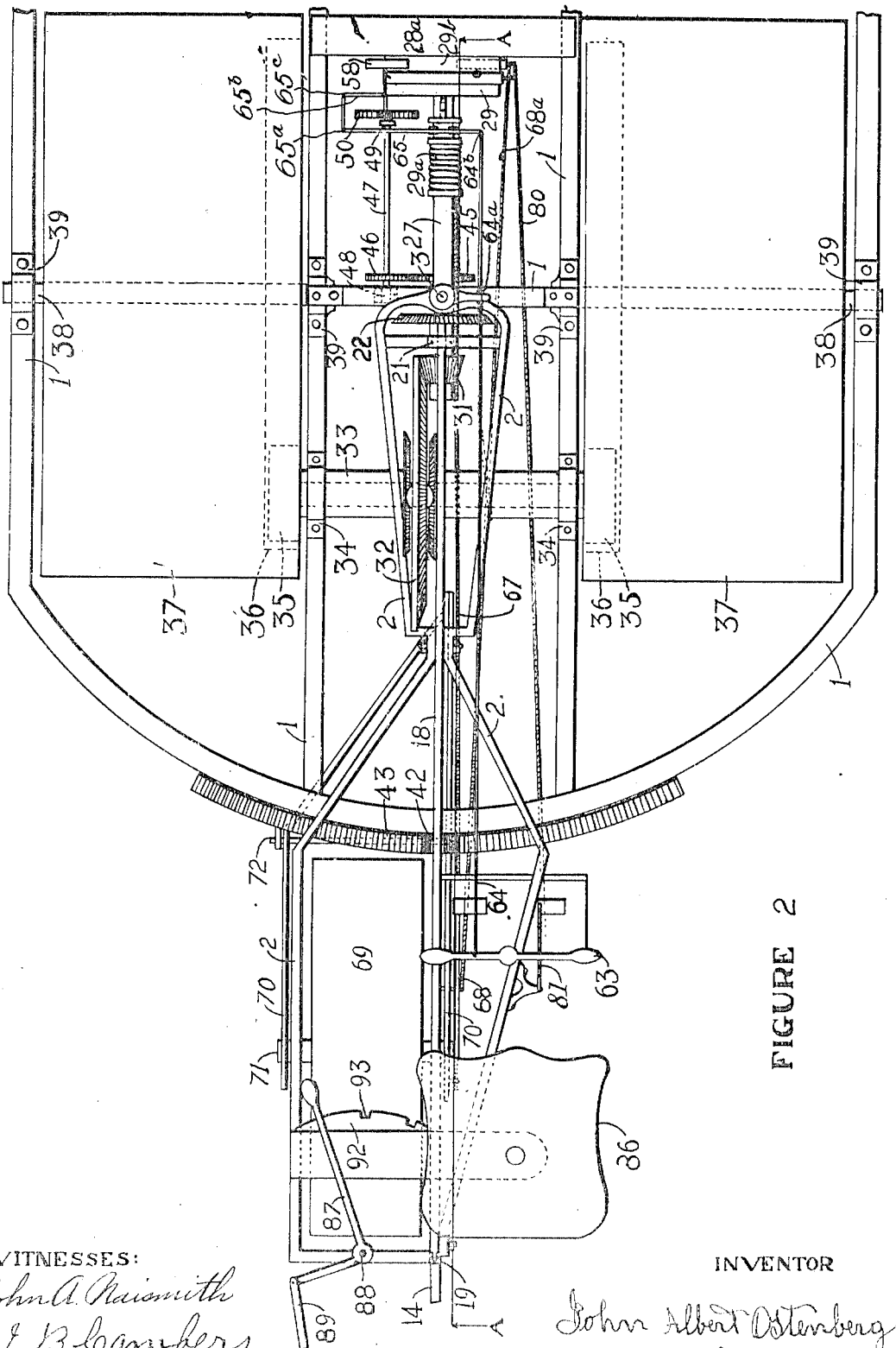
Figure 3:
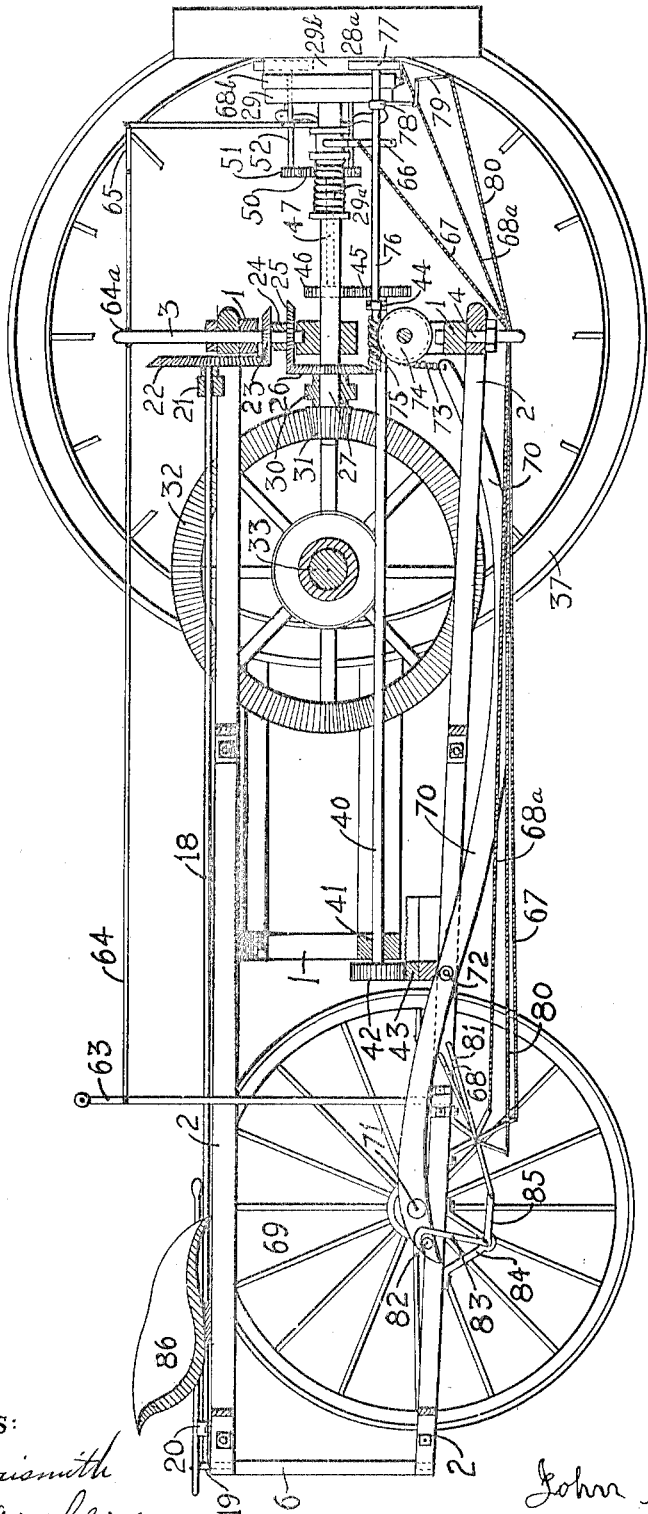

With these and various other objects in view, my invention has relation to certain novel features of construction and operation, an example of which is described in the following specification, and illustrated in the accompanying drawings; wherein:

Figure 1 is a side elevation of my motor plow complete. Fig. 2 is a plan view of my motor plow, parts being broken away. Fig. 3 is a sectional view on line A—A of Fig. 2. Fig. 4 is a plan view of the plow beam and the connections thereto. Fig. 5 is a detail view of a portion of the steering mechanism. Fig. 6 is a detail view of a portion of the steering mechanism showing its relation to the friction drum.

Referring now more particularly to the drawings, wherein like reference numerals designate similar parts throughout the several views,—1 designates the main frame constructed of suitable material, preferably of steel of the proper width and thickness, bent and formed in shape as shown in the drawings, the same being bolted together in a strong manner. Auxiliary frame 2 is connected to frame 1 by pivot pin 3 at the top thereof, and by pivot pin 4 at the bottom thereof, and is turnable on said pins. Plow beam 5 is connected to said frame 2 by pivot pin 6 and is turnable thereon. Fastened to plow beam 5 are arms 7, the same being adjustable on plow beam 5, for the purpose of carrying one or more disk plows as shown at 8. Connected to plow beam 5 is arm 9. At the outer end of said arm 9 is connected furrow wheel 10 by stud 11, said furrow wheel may be made of cast iron or any other suitable material, having a gear 12 attached thereto, the same being driven by pinion gear 13 attached to shaft 14, near the end thereof, said shaft being supported at the outer end thereof by arm 15 carrying shaft bearing 17, said arm being fastened to arm 9 as shown at 16, said shaft 14 extending forward to frame 2 where the same is connected to furrow wheel driving shaft 18 by universal joint 19. Said shaft 18 is supported by bearings 20 and 21 on auxiliary frame 2. On the forward end of shaft 18 is fastened beveled gear 22 connecting with beveled gear 23, which is keyed to sleeve 24. On the lower end of said sleeve 24 is keyed bevel gear 25. Sleeve 24 is turnable on pivot pin 3. Beveled gear 25 connects to beveled gear 26 which is keyed to main driving shaft 27. By these means the power is transmitted to shaft 18 and shaft 14, and thus to furrow wheel 10. Main driving shaft 27 is connected to motor 28 by disk clutch 29 and fly wheel 28ª. Said shaft 27 extends back a distance and is held in place on frame 1 by bearing 30. Keyed to the end of shaft 27 is beveled pinion gear 31, which connects to differential gear 32, said differential gear being connected to shaft 33, said shaft being held in place on frame 1 by bearings 34. On both ends of shaft 33 are keyed pinion gears 35; these gears come in contact with internal gear 36, on the inside and inner edge of traction wheels 37, said traction wheels being turnable on shaft 38, the same being held in place on frame 1 by clamps 39. The rear end of frame 1 is made arcuate in shape. In the center thereof is attached shaft 40 by bearing 41. On the end of said shaft is pinion gear 42 adapted to engage gear rack 43, said gear rack being arcuate in shape. Said gear rack may be fastened to frame 2 in any secure manner. Shaft 40 extends forward and is held in place by bearing 44. On the end of said shaft 40 is spur gear 45, which comes in contact with spur gear 46, said gear being keyed to shaft 47, said shaft being kept in place on frame 1 by bearings 48 and 49. On the forward end of shaft 47 is keyed an internal and external gear 50; the internal portion thereof comes in contact with pinion gear 51 keyed to shaft 52, said shaft being held in place on rocker frame 55 by bearing 53 and bearing 54 on rocker frame 55, which is held in place and operates on pivot 56 supported by frame 1. Keyed to the forward end of shaft 52 is friction wheel 57, which when required comes in contact with the outside of friction drum 29ᵇ. On the other end of rocker arm 55 is friction wheel 58 keyed to shaft 59. On the inner end of said shaft 59 is keyed pinion gear 60, which comes in contact with the external part of gear 50, said shaft 59 being held in place on rocker frame 55 by bearing 61 and bearing 62. These gears and friction wheels 57 and 58, are for the purpose of steering the motor plow by power from the motor 28, and the same is operated by steering arm 63, to which is connected steering rod 64, having a swivel joint at 64ª, and connecting to one end of bell crank 65 by pivot joint 64ᵇ. Bell crank 65 is pivoted at 65ª. To the other end of bell crank 65 is connected a link 65ᵇ by means of pivot joint 65ᶜ, said link 65ᵇ being pivotally connected to rocker frame 55 at 65ᵈ, and thus by turning steering arm 63 to the right connects friction wheel 57 to the outside of friction drum 29ᵇ causing shaft 40 to revolve to the left with pinion gear 42 engaging gear rack 43 causes frame 1 to swing around to the right on traction wheels 37, and vice versa when steering arm 63 is turned to the left and friction wheel 58 is brought in contact with the outside of drum 29ᵇ. Said clutch 29 is operated by spiral spring 29ª and releasing lever 66 to which is attached wire cord 67 leading to bell crank foot lever treadle 68. Spiral spring 29ª engages clutch 29 and by pressing lever 68 part way down said clutch 29 is released. By pressing said lever 68 clear down the wire cord 68ª operates the brake 68ᵇ and connects the planetary reverse, thus reversing the shaft 27, and thereby reversing the direction of movement of the motor plow. Lifting wheel 69 is connected to lever arms 70, one on each side of said wheel 69, by shaft 71, said lever arms 70 are connected to frame 2 by fulcrum pin 72. Said lever arms 70 extend forward a distance and are connected by chain 73 to chain drum 74, said drum being driven by worm gear 75 keyed to shaft 76. On the forward end of said shaft 76 is keyed friction wheel 77, said friction wheel being held in place by bearing 78 on rocker arm 79, and operates when in connection with the outside of friction drum 29ᵇ. Connecting with rocker arm 79 is wire rope 80, extending back and connecting with bell crank foot lever 81.

When it becomes necessary to lift the plows 8 out of the ground, the operator presses down on the foot lever 81, which connects friction wheel 77 to the outside of friction drum 29ᵇ, thereby revolving shaft 76 and worm gear 75, which in turn works chain drum 74, winding up chain 73. This draws up the forward ends of lever arms 70 and forces down wheel 69, thereby raising plows 8 out of the ground. On the end of lever 70 is fastened a short stud 82 which engages hook 83 and holds lever arms 70 in place when plows 8 are raised out of the ground, this allows the operator to take his foot off of the foot lever 81 which releases friction wheel 77, and the plows 8 are then held up clear of the ground by hook 83 engaging stud 82. Hook 83 is held in place by bracket 84 fastened to frame 2, and is operated by lever 85. Operator's seat is shown at 86, which may be made of cast iron or any other suitable material and of any shape desired. At the left of seat 86 is bell crank lever 87 connected to frame 2 by fulcrum pin 88. To bell crank lever 87 is connected iron rod 89 by bolt 90. The other end of said iron rod 89 is connected to plow beam 5 by bolt 91. This lever 87 is for the purpose of adjusting plows 8 in any required position, said lever 87 being held in place by notched bar 92, fastened to frame 2 by bolts 93. While disk plows are shown and described, I do not wish to confine myself to them alone as any other form of plow or cultivator may be attached in the same or a similar way.

Having thus described my invention what I claim as new and desire to secure by Letters Patent, is:—

1. The combination with a traction engine of a plow frame and means for pivotally connecting the same to said traction engine, said plow frame having a plurality of plows adjustably mounted thereon and a posteriorly projecting arm rigidly attached thereto, a furrow wheel mounted on said posteriorly projecting arm, and mechanism operatively connected thereto by which said furrow wheel is driven coöperatively with said traction engine as shown and described.

2. The combination with a traction engine of a plow frame pivotally connected thereto, a plurality of plows adjustably mounted on said plow frame, a furrow wheel revolubly mounted thereon, driving mechanism operatively connecting said furrow wheel to said traction engine, means for changing the angular relation of said plow frame to said traction engine in a horizontal plane, and means for securing said plow frame in rigid relation to said traction engine in any angular relation required substantially as shown and described.

3. The combination with a traction engine of a plow beam adapted to carry one or more plows pivotally attached thereto, a plurality of plows adjustably mounted thereon, an arm extending out from said plow beam, a furrow wheel mounted thereon, said furrow wheel having a gear fastened thereto, a pinion gear adapted to engage said gear, a shaft to carry said pinion gear, a secondary arm attached to said first mentioned arm as a support for said shaft, and means for operatively connecting said shaft to the driving mechanism of said traction engine, substantially as shown and described.

4. The combination with a traction engine having a vertically adjustable frame of a plow beam adapted to carry one or more plows pivotally attached to said frame, a plurality of plows adjustably mounted on said plow beam, a posteriorly projecting arm attached to said plow beam, a furrow wheel mounted on said posteriorly projecting arm, driving mechanism operatively connecting said furrow wheel to said traction engine, means for changing the angular relation of said plow beam to said frame in a horizontal plane, and means for securing said plow beam in rigid relation to said frame in any angular adjustment required, substantially as shown and described.

In testimony whereof, I have hereunto signed my name before two subscribing witnesses.

JOHN ALBERT OSTENBERG.

Witnesses:
JOHN A. NAISMITH,
J. B. CAMBERS.